US011493206B2

(12) United States Patent
Wada et al.

(10) Patent No.: US 11,493,206 B2
(45) Date of Patent: Nov. 8, 2022

(54) GAS TURBINE COMBUSTOR HAVING MAIN FUEL VALVES INDEPENDENTLY ADJUSTABLE

(71) Applicant: Mitsubishi Heavy Industries, Ltd., Tokyo (JP)

(72) Inventors: Yasuhiro Wada, Yokohama (JP); Kazuki Abe, Tokyo (JP); Akinori Hayashi, Yokohama (JP); Keita Naito, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 17/244,231

(22) Filed: Apr. 29, 2021

(65) Prior Publication Data
US 2021/0341149 A1    Nov. 4, 2021

(30) Foreign Application Priority Data

May 1, 2020    (JP) ............................. JP2020-081061

(51) Int. Cl.
*F23R 3/34*     (2006.01)
*F02C 9/26*     (2006.01)
(Continued)

(52) U.S. Cl.
CPC .............. *F23R 3/346* (2013.01); *F02C 9/263* (2013.01); *F23R 3/343* (2013.01); *F02C 9/40* (2013.01);
(Continued)

(58) Field of Classification Search
CPC .. F23R 3/286; F23R 3/34; F23R 3/343; F23R 3/346; F23R 2900/03343; F02C 9/263; F02C 7/228; F02C 7/232
See application file for complete search history.

(56) References Cited

U.S. PATENT DOCUMENTS

| 4,716,719 A | * | 1/1988 | Takahashi | ................. F02C 9/26 60/247 |
| 5,303,542 A | * | 4/1994 | Hoffa | ........................ F23R 3/26 60/746 |

(Continued)

FOREIGN PATENT DOCUMENTS

| CN | 205156011 U | 4/2016 |
| CN | 105987401 A | 10/2016 |

(Continued)

OTHER PUBLICATIONS

English Translation of Chinese Office action in Chinese Application 202110468514, dated Apr. 28, 2022 (8 pages).*

(Continued)

*Primary Examiner* — William H Rodriguez
(74) *Attorney, Agent, or Firm* — Crowell & Moring LLP

(57) ABSTRACT

Provided is a gas turbine combustor that can achieve improvement of the combustion stability. A gas turbine combustor includes a pilot burner of the diffusion combustion type, a pilot flow control valve that regulates a flow rate of fuel to be supplied to the pilot burner, a main burner of the premix combustion type arranged on an outer circumference side of the pilot burner, main flow control valves that regulate flow rates of fuel to be individually supplied to burner sectors into which the main burner is sectioned in a circumferential direction, and a controller configured to control the pilot flow control valve and the main flow control valves. The controller controls the main flow control valves such that, when fuel is to be supplied to all the burner sectors, a difference in fuel flow rate occurs between at least one burner sector and the other burner sectors among the burner sectors.

2 Claims, 5 Drawing Sheets

(51) Int. Cl.
*F23R 3/28* (2006.01)
*F02C 9/40* (2006.01)

(52) U.S. Cl.
CPC ..... *F23R 3/286* (2013.01); *F23R 2900/03343* (2013.01)

(56) References Cited

U.S. PATENT DOCUMENTS

| | | | | |
|---|---|---|---|---|
| 5,319,931 A * | 6/1994 | Beebe | ....................... | F02C 9/34 60/773 |
| 6,092,362 A * | 7/2000 | Nagafuchi | ................ | F02C 9/34 60/739 |
| 2006/0101814 A1 * | 5/2006 | Saitoh | .................... | F23R 3/286 60/377 |
| 2013/0192245 A1 * | 8/2013 | Miura | ....................... | F23R 3/04 60/776 |
| 2016/0273449 A1 | 9/2016 | DiCintio et al. | | |
| 2016/0273458 A1 * | 9/2016 | Kim | ....................... | F02C 7/222 |
| 2019/0242581 A1 * | 8/2019 | Abe | ....................... | F23R 3/286 |
| 2021/0095599 A1 * | 4/2021 | Asai | ....................... | F02C 9/263 |

FOREIGN PATENT DOCUMENTS

| | | |
|---|---|---|
| CN | 110118363 A | 8/2019 |
| DE | 10 2013 016 202 A1 | 4/2015 |
| JP | 2014-240635 A | 12/2014 |

OTHER PUBLICATIONS

German-language Office Action issued in German Application No. 10 2021 204 320.8 dated Jun. 21, 2021 with partial English translation (nine (9) pages).

Chinese-language Office Action issued in Chinese Application No. 202110468514.X dated Apr. 28, 2022 (eight (8) pages).

* cited by examiner

GAS TURBINE COMBUSTOR HAVING MAIN FUEL VALVES INDEPENDENTLY ADJUSTABLE

BACKGROUND OF THE INVENTION

1. Field of the Invention

The present invention relates to a gas turbine combustor.

2. Description of the Related Art

A gas turbine combustor disclosed in JP-2014-240635-A includes a pilot burner and a main burner arranged on the outer circumference side of the pilot burner. The pilot burner is of the diffusion combustion type and directly injects fuel into a combustion chamber. The main burner is of the premix combustion type, and mixes fuel and air in a premix flow path and supplies the mixture to the combustion chamber. Although the premix combustion is low in flame stability in comparison with the diffusion combustion, it reduces NOx emissions.

The gas turbine combustor disclosed in JP-2014-240635-A further includes a pilot flow control valve that regulates the flow rate of fuel to be supplied to the pilot burner, four main flow control valves each of which regulates the flow rate of fuel to be supplied to each of four burner sectors into which the main burner is sectioned in a circumferential direction, and a controller configured to control the pilot flow control valve and the main flow control valves.

The controller controls the pilot flow control valve and the main flow control valves after the gas turbine is activated until the gas turbine enters full load operation. More particularly, the controller performs control such that fuel is supplied only to the pilot burner first, and then increases the flow rate of the fuel. Thereafter, the controller switches the control such that fuel is supplied to the pilot burner and one of the burner sectors, and then increases the fuel flow rates of them. Then, the controller switches the control such that fuel is supplied to the pilot burner and two of the burner sectors, and then increases the fuel flow rates of them. Thereafter, the controller switches the control such that fuel is supplied to the pilot burner and three of the burner sectors, and then increases the fuel flow rates of them. Thereafter, the controller switches the control such that fuel is supplied to the pilot burner and the four burner sectors, and then increases the fuel flow rates of them.

SUMMARY OF THE INVENTION

Although JP-2014-240635-A does not include a clear description, when fuel is supplied to all the burner sectors, the controller controls the fuel flow rates of the respective burner sectors so as to be uniform among them. When fuel is supplied to all the burner sectors, the fuel flow rate of the main burner of the premix combustion type is extremely higher than the fuel flow rate of the pilot burner of the diffusion combustion type. Therefore, a phenomenon that the fluctuation of flame is amplified occurs. The inventors of the present invention have noticed that, when fuel is supplied to all burner sectors, if the fuel flow rate of at least one burner sector is made different from that of the other burner sectors, then it is possible to suppress fluctuation of flame to improve the combustion stability.

It is an object of the present invention to provide a gas turbine combustor that can achieve improvement of the combustion stability.

In order to achieve the object described above, according to an embodiment of the present invention, there is provided a gas turbine combustor including a pilot burner, a pilot flow control valve that regulates a flow rate of fuel to be supplied to the pilot burner, a main burner of the premix combustion type arranged on an outer circumference side of the pilot burner, a plurality of main flow control valves that regulate flow rates of fuel to be individually supplied to a plurality of burner sectors into which the main burner is sectioned in a circumferential direction, and a controller configured to control the pilot flow control valve and the plurality of main flow control valves. The controller controls the plurality of main flow control valves such that, when fuel is to be supplied to all of the plurality of burner sectors, a difference in fuel flow rate occurs between at least one burner sector and the other burner sectors among the plurality of burner sectors.

According to the present invention, improvement of the combustion stability can be achieved.

DESCRIPTION OF THE PREFERRED EMBODIMENTS

An embodiment of the present invention is described with reference to the drawings.

Figure 1:
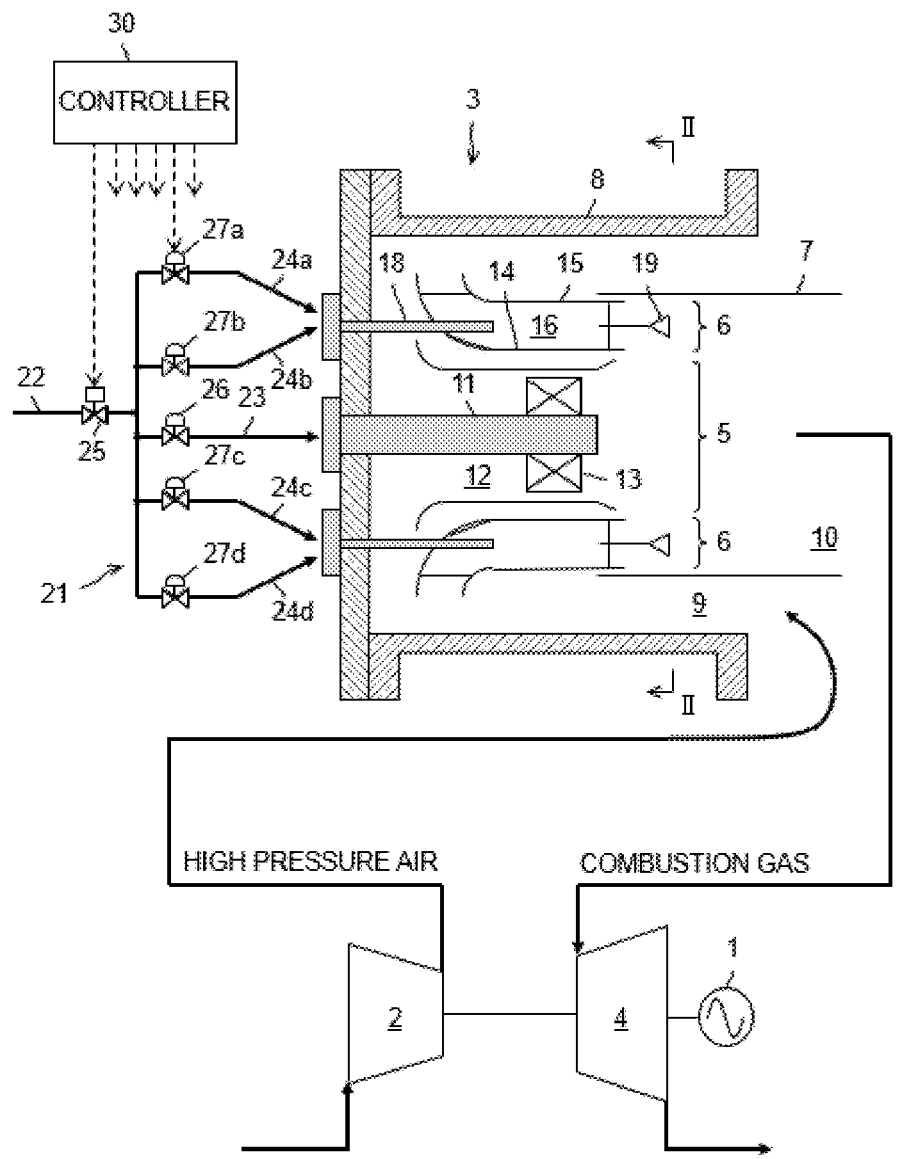
FIG. 1 is a schematic view depicting a structure of a gas turbine combustor according to an embodiment of the present invention and a configuration of a gas turbine that includes the gas turbine combustor.
Figure 2:
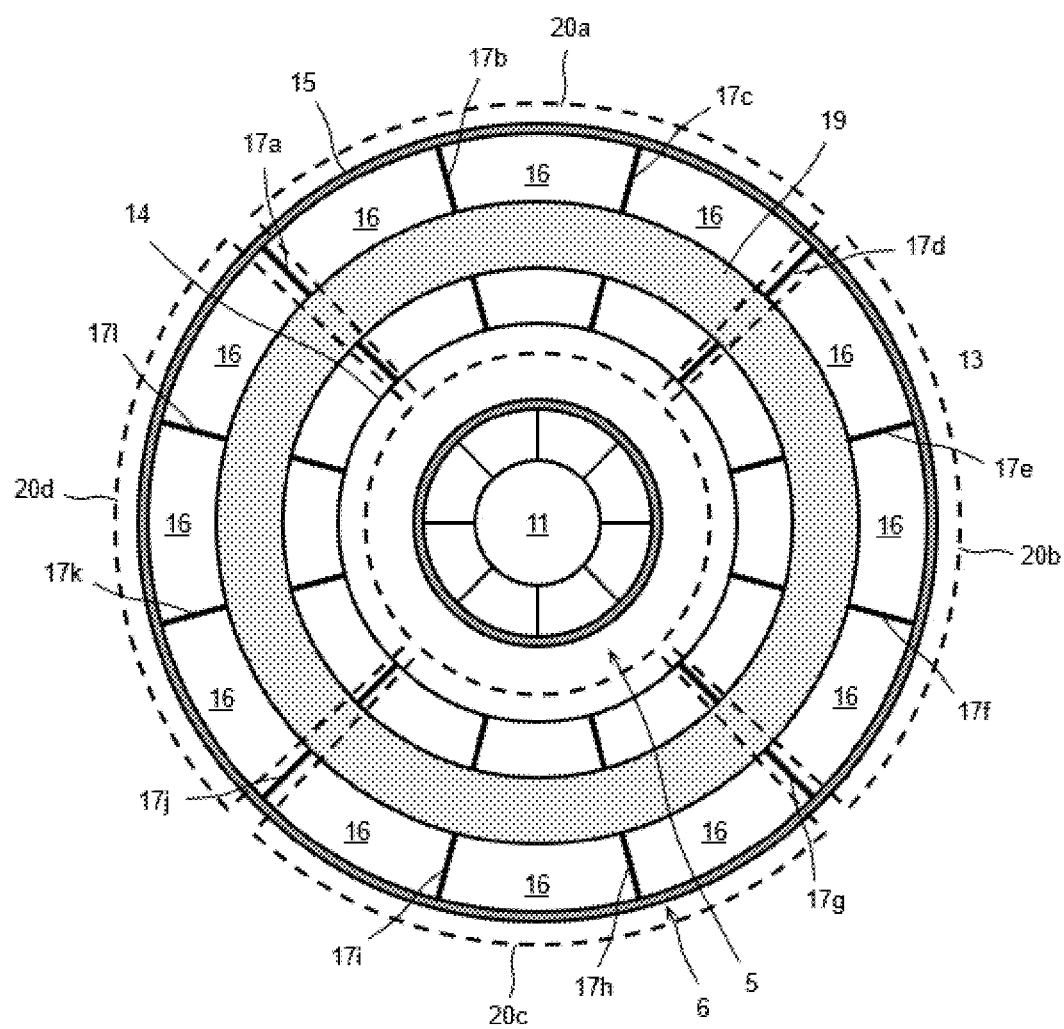
FIG. 2 is a cross sectional view taken along a line II-II of FIG. 1.

FIG. 1 is a schematic view representing a structure of a gas turbine combustor according to the present embodiment and a configuration of a gas turbine that includes the gas turbine combustor. FIG. 2 is a cross sectional view taken along a line II-II of FIG. 1. It is to be noted that, in FIG. 2, illustrations of a liner and a casing is omitted for the convenience of illustration.

A gas turbine plant of the present embodiment includes a generator 1 and a gas turbine that drives the generator 1. The gas turbine includes a compressor 2 that generates high pressure air, a combustor 3 that burns fuel and the high pressure air from the compressor 2, and a turbine 4 that is driven by combustion gas from the combustor 3. The generator 1 and the compressor 2 are connected coaxially to the turbine 4 and are driven by the turbine 4.

The combustor 3 (gas turbine combustor) includes a pilot burner 5, a main burner 6 arranged on the outer circumference side of the pilot burner 5, and a cylindrical liner 7 arranged on the downstream side (on the right side in FIG. 1) of the pilot burner 5 and the main burner 6. On the outer side of the liner 7 (namely, between the liner 7 and a casing 8), an air flow path 9 is formed which supplies the high pressure air from the compressor 2 to the pilot burner 5 and the main burner 6. A combustion chamber 10 is formed on the inner side of the liner 7.

The pilot burner 5 is of the diffusion combustion type and includes a fuel nozzle 11 that injects fuel into the combustion chamber 10, an air flow path 12 formed on the outer circumference side of the fuel nozzle 11, and a plurality of swirling blades 13 arranged in the air flow path 12 so as to produce swirling flows. The air flow path 12 is connected to the air flow path 9 described above. The pilot burner 5 injects fuel from the fuel nozzle 11 into the combustion chamber 10 and supplies air from the air flow path 12 to the combustion chamber 10. It is to be noted that the pilot burner 5 is not limited to that of the diffusion combustion type and may be that of a different combustion type.

The main burner 6 is of the premix combustion type and includes an inner cylinder 14, an outer cylinder 15, a plurality of barrier walls 17a to 17l, a plurality of fuel nozzles 18, and an annular flame holder 19. The inner cylinder 14 is arranged on the outer circumference side of the pilot burner 5, and the outer cylinder 15 is arranged on the outer circumference side of the inner cylinder 14. The plurality of barrier walls 17a to 17l section the space between the inner cylinder 14 and the outer cylinder 15 in a circumferential direction to form a plurality of (in the present embodiment, 12) premix flow paths 16. The plurality of fuel nozzles 18 inject fuel to the plurality of premix flow paths 16. In the present embodiment, 24 fuel nozzles 18 are provided, that is, two fuel nozzles 18 are provided for each of the premix flow paths 16. The flame holder 19 is arranged on the downstream side of the plurality of premix flow paths 16. The premix flow paths 16 are connected to the air flow path 9 described hereinabove. The main burner 6 mixes, in the premix flow paths 16 thereof, fuel from the fuel nozzles 18 and air from the air flow path 9 to form mixture and supplies the mixture to the combustion chamber 10.

The main burner 6 is sectioned into four burner sectors 20a to 20d by the barrier walls 17a, 17d, 17g, and 17j. Each of the burner sectors 20a to 20d includes three sets of a premix flow path 16 and a fuel nozzle 18. In the combustion chamber 10, the fuel and air supplied from the pilot burner 5 and any of the burner sectors 20a to 20d burn, and combustion gas is thus produced.

The combustor 3 further includes a fuel system 21 that supplies fuel to the pilot burner 5 and the burner sectors 20a to 20d, and a controller 30. The fuel system 21 includes a common fuel system 22, a pilot fuel system 23, and main fuel systems 24a to 24d. The common fuel system 22 is connected to a fuel supply source (not depicted), and the pilot fuel system 23 is branched from the common fuel system 22 and supplies fuel to the pilot burner 5. The main fuel systems 24a to 24d are branched from the common fuel system 22 and supply fuel to the burner sectors 20a to 20d, respectively.

A cutoff valve 25 is provided for the common fuel system 22. A pilot flow control valve 26 is provided for the pilot fuel system 23, and main flow control valves 27a to 27d are provided for the main fuel systems 24a to 24d, respectively. The pilot flow control valve 26 regulates the flow rate of fuel to be supplied to the pilot burner 5, more particularly, to the fuel nozzle 11. Each of the main flow control valves 27a to 27d regulates the flow rate of fuel to be supplied to a corresponding burner sector, more particularly, to six fuel nozzles 18 through a header not depicted.

The controller 30 controls the pilot flow control valve 26 and the main flow control valves 27a to 27d according to an operation situation of the gas turbine, to control the supply range and the flow rate of fuel. Details thereof are described below with reference to FIGS. 3 and 4.

Figure 3:
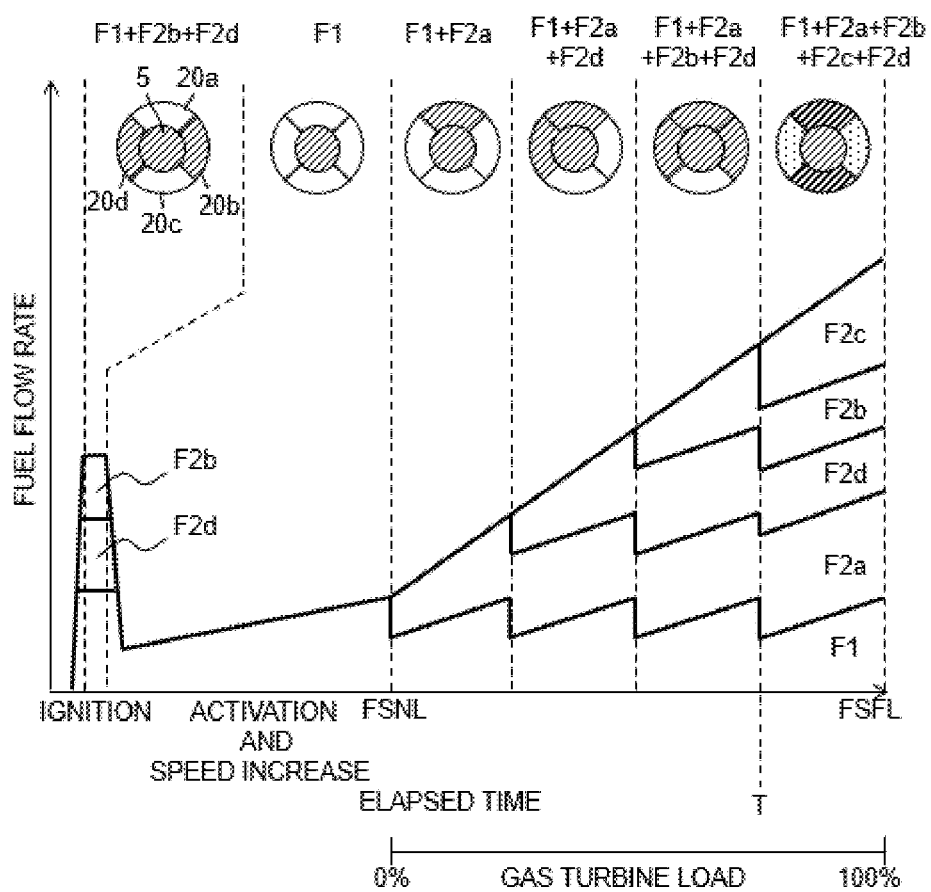
FIG. 3 is a time chart depicting transition of fuel supply in the gas turbine combustor according to the embodiment of the present invention.
Figure 4:
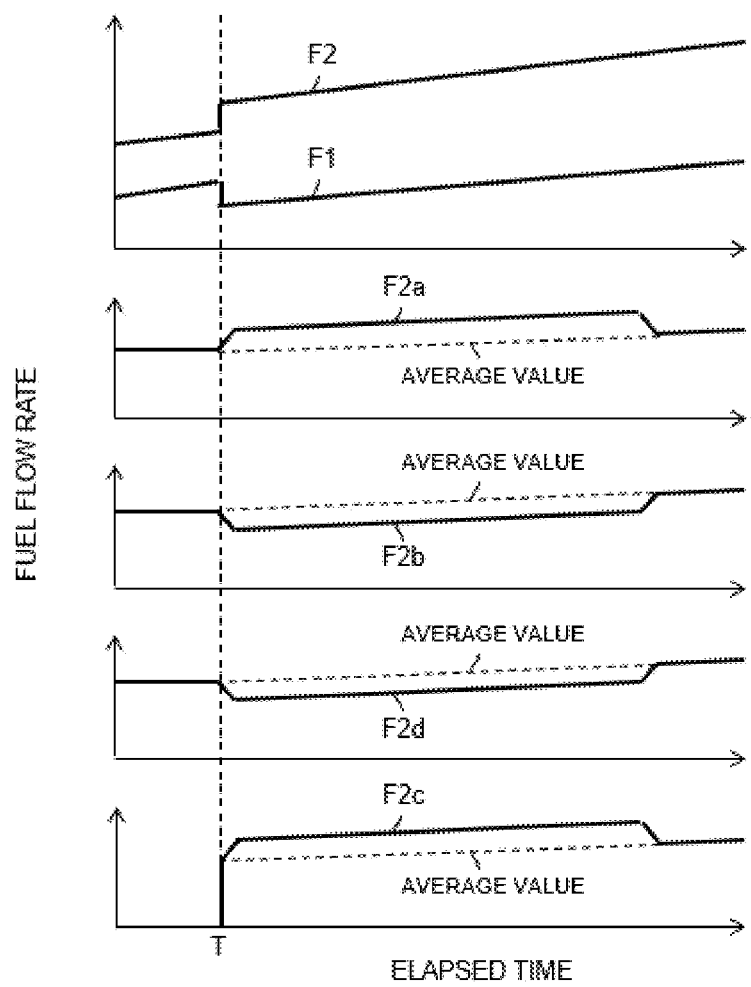
FIG. 4 is a time chart depicting transition of the fuel flow rate after a time T of FIG. 3.

FIG. 3 is a time chart representative of transition of fuel supply in the gas turbine combustor in the present embodiment. An upper side portion of FIG. 3 depicts transition of a fuel supply range (hatching line portion) among the pilot burner 5 and the burner sectors 20a to 20d. A lower side portion of FIG. 3 indicates transition of a fuel flow rate F1 of the pilot burner 5, a fuel flow rate F2a of the burner sector 20a, a fuel flow rate F2b of the burner sector 20b, a fuel flow rate F2c of the burner sector 20c, and a fuel flow rate F2d of the burner sector 20d. FIG. 4 is a time chart indicative of transition of the fuel flow rate F1 of the pilot burner 5, a fuel flow rate F2 of the main burner 6, the fuel flow rate F2a of the burner sector 20a, the fuel flow rate F2b of the burner sector 20b, the fuel flow rate F2c of the burner sector 20c, and the fuel flow rate F2d of the burner sector 20d after a time T in FIG. 3.

At the time of ignition (activation) of the gas turbine, the controller 30 controls the cutoff valve 25, the pilot flow control valve 26, and the main flow control valves 27b and 27d to enter an open state and controls the main flow control valves 27a and 27c to enter a closed state. Consequently, fuel and high pressure air are supplied from the pilot burner 5 and the burner sectors 20b and 20d to the combustion chamber 10.

After ignition (activation) of the gas turbine, the controller 30 controls the cutoff valve 25 and the pilot flow control valve 26 to enter an open state and controls the main flow control valves 27a to 27d to enter a closed state. Consequently, fuel and high pressure air are supplied from the pilot burner 5 to the combustion chamber 10. The controller 30 thereafter increases the opening of the pilot flow control valve 26 until the speed of rotation of the turbine 4 reaches a rated speed of rotation, in other words, until the gas turbine reaches a full speed no load (FSNL) state, to increase the fuel flow rate F1 of the pilot burner 5.

After the speed of rotation of the turbine 4 reaches the rated speed of rotation, power generation of the generator 1 is started, and the load on the gas turbine is gradually increased until the gas turbine reaches a full speed full load (FSFL) state. More particularly, the controller 30 first switches the main flow control valve 27a from a closed state to an open state. Consequently, fuel and high pressure air are supplied from the pilot burner 5 and the burner sector 20a to the combustion chamber 10. At the time of this switching of the main flow control valve 27a, the controller 30 decreases the opening of the pilot flow control valve 26 to decrease the fuel flow rate F1 of the pilot burner 5. This suppresses a change from the total fuel flow rate F1 to a total fuel flow rate (F1+F2a). Thereafter, the controller 30 increases the opening of the pilot flow control valve 26 and the opening of the main flow control valve 27a to increase the fuel flow rate F1 of the pilot burner 5 and the fuel flow rate F2a of the burner sector 20a.

After the load on the gas turbine reaches a first value, the controller 30 switches the main flow control valve 27d from a closed state to an open state. Consequently, fuel and high pressure air are supplied from the pilot burner 5 and the burner sectors 20a and 20d to the combustion chamber 10.

At the time of this switching of the main flow control valve 27d, the controller 30 decreases the opening of the pilot flow control valve 26 to decrease the fuel flow rate F1 of the pilot burner 5. This suppresses a change from the total fuel flow rate (F1+F2a) to a total fuel flow rate (F1+F2a+F2d). Thereafter, the controller 30 increases the opening of the pilot flow control valve 26, the opening of the main flow control valve 27a, and the opening of the main flow control valve 27d to increase the fuel flow rate F1 of the pilot burner 5, the fuel flow rate F2a of the burner sector 20a, and the fuel flow rate F2d of the burner sector 20d. At this time, the fuel flow rate F2a of the burner sector 20a and the fuel flow rate F2d of the burner sector 20d are made equal to each other.

After the load on the gas turbine reaches a second value (where second value>first value), the controller 30 switches the main flow control valve 27b from a closed state to an open state. Consequently, fuel and high pressure air are supplied from the pilot burner 5 and the burner sectors 20a, 20b, and 20d to the combustion chamber 10. At the time of this switching of the main flow control valve 27b, the controller 30 decreases the opening of the pilot flow control valve 26 to decrease the fuel flow rate F1 of the pilot burner 5. This suppresses a change from the total fuel flow rate (F1+F2a+F2d) to a total fuel flow rate (F1+F2a+F2b+F2d). Thereafter, the controller 30 increases the opening of the pilot flow control valve 26, the opening of the main flow control valve 27a, the opening of the main flow control valve 27b, and the opening of the main flow control valve 27d to increase the fuel flow rate F1 of the pilot burner 5, the fuel flow rate F2a of the burner sector 20a, the fuel flow rate F2b of the burner sector 20b, and the fuel flow rate F2d of the burner sector 20d. At this time, the fuel flow rate F2a of the burner sector 20a, the fuel flow rate F2b of the burner sector 20b, and the fuel flow rate F2d of the burner sector 20d are made equal to each other.

After the load on the gas turbine reaches a third value (where third value>second value) (time T), the controller 30 switches the main flow control valve 27c from a closed state to an open state. Consequently, fuel and high pressure air are supplied from the pilot burner 5 and the burner sectors 20a, 20b, 20c, and 20d to the combustion chamber 10. At the time of this switching of the main flow control valve 27c, the controller 30 decreases the opening of the pilot flow control valve 26 to decrease the fuel flow rate F1 of the pilot burner 5. This suppresses a change from the total fuel flow rate (F1+F2a+F2b+F2d) to a total fuel flow rate (F1+F2a+F2b+F2c+F2d). Thereafter, the controller 30 increases the opening of the pilot flow control valve 26, the opening of the main flow control valve 27a, the opening of the main flow control valve 27b, the opening of the main flow control valve 27c, and the opening of the main flow control valve 27d to increase the fuel flow rate F1 of the pilot burner 5, the fuel flow rate F2a of the burner sector 20a, the fuel flow rate F2b of the burner sector 20b, the fuel flow rate F2c of the burner sector 20c, and the fuel flow rate F2d of the burner sector 20d.

At this time, as a characteristic of the present embodiment, the controller 30 controls the main flow control valves 27a to 27d such that a difference in fuel flow rate occurs between the burner sectors 20a and 20c and the burner sectors 20b and 20d. More particularly, with respect to an average value of the fuel flow rates of the burner sectors 20a to 20d (=(F2a+F2b+F2c+F2d)/4), the fuel flow rate F2a of the burner sector 20a and the fuel flow rate F2c of the burner sector 20c are increased while the fuel flow rate F2b of the burner sector 20b and the fuel flow rate F2d of the burner sector 20d are decreased. Consequently, while, when fuel is supplied to all of the burner sectors 20a to 20d, a phenomenon of amplifying fluctuations of combustion flame is likely to occur, this phenomenon can be suppressed. Accordingly, improvement of the combustion stability can be achieved.

Further, in the present embodiment, each fuel flow rate of the burner sectors 20a to 20d increases and decreases alternately in the circumferential direction with respect to the average value of the fuel flow rates of the burner sectors 20a to 20d. Consequently, in comparison with an alternative case in which each fuel flow rate does not increase and decrease alternately in the circumferential direction, the combustion stability can be enhanced. As a result, a local rise of the metal temperature on the downstream side can be suppressed.

It is to be noted that, although the embodiment described above takes, as an example, a case in which the main burner 6 is sectioned into the four burner sectors 20a to 20d by the barrier walls 17a, 17d, 17g, and 17j and the fuel system 21 has four sets of a main fuel system and a main flow control valve individually corresponding to the four burner sectors 20a to 20d, this is not restrictive.

Figure 5:
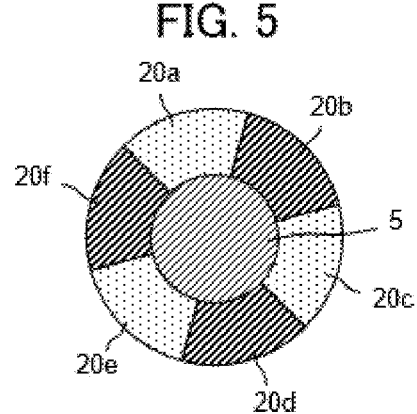
FIG. 5 is a schematic view illustrating six burner sectors and a relation between fuel flow rates of the six burner sectors in a first modification of the present invention.

For example, as in the case of a first modification depicted in FIG. 5, the main burner 6 may be sectioned into six burner sectors 20a to 20f by barrier walls 17a, 17c, 17e, 17g, 17i, and 17k, and the fuel system 21 may include six sets of a main fuel system and a main flow control valve individually corresponding to the six burner sectors 20a to 20f. In this modification, when fuel is to be supplied to all of the burner sectors 20a to 20f, the controller 30 controls the main flow control valves such that a difference in fuel flow rate occurs between the burner sectors 20a, 20c, and 20e and the burner sectors 20b, 20d, and 20f. More particularly, with respect to an average value of the fuel flow rates of the burner sectors 20a to 20f (=(F2a+F2b+F2c+F2d+F2e+F2f)/6), the fuel flow rate F2b of the burner sector 20b, the fuel flow rate F2d of the burner sector 20d, and the fuel flow rate F2f of the burner sector 20f are increased while the fuel flow rate F2a of the burner sector 20a, the fuel flow rate F2c of the burner sector 20c, and the fuel flow rate F2e of the burner sector 20e are decreased. Consequently, advantageous effects similar to those in the embodiment described above can be obtained.

Figure 6:
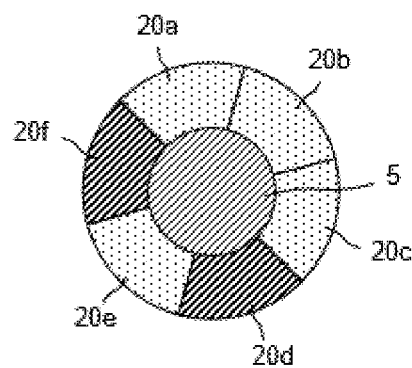
FIG. 6 is a schematic view illustrating six burner sectors and a relation between fuel flow rates of the six burner sectors in a second modification of the present invention.

As an alternative, as in the case of a second modification depicted in FIG. 6, when fuel is to be supplied to all of the burner sectors 20a to 20f, the controller 30 controls the main flow control valves such that a difference in fuel flow rate occurs between the burner sectors 20a, 20b, 20c, and 20e and the burner sectors 20d, and 20f. More particularly, with respect to an average value of the fuel flow rates of the burner sectors 20a to 20f, the fuel flow rate F2d of the burner sector 20d and the fuel flow rate F2f of the burner sector 20f are increased while the fuel flow rate F2a of the burner sector 20a, the fuel flow rate F2b of the burner sector 20b, the fuel flow rate F2c of the burner sector 20c, and the fuel flow rate F2e of the burner sector 20e are decreased. With this modification, although advantageous effects same as those in the first modification are not obtained, the combustion stability can be improved.

Figure 7:
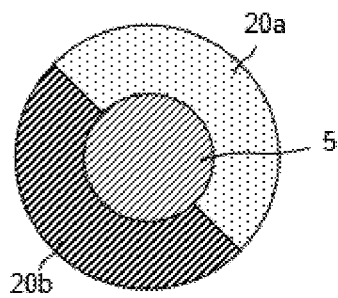
FIG. 7 is a schematic view illustrating two burner sectors and a relation between fuel flow rates of the two burner sectors in a third modification of the present invention.

As another alternative, for example, as in the case of a third modification depicted in FIG. 7, the main burner 6 may be sectioned into two burner sectors 20a and 20b by barrier walls 17a and 17g, and the fuel system 21 may include two sets of a main fuel system and a main flow control valve individually corresponding to the two burner sectors 20a and 20b. In this modification, the controller 30 controls the main flow control valves such that, when fuel is to be supplied to all of the burner sectors 20a and 20b, a difference in fuel flow rate occurs between the burner sector 20*a* and the burner sector 20*b*. More particularly, with respect to an average value of the fuel flow rates of the burner sectors 20*a* and 20*b*, the fuel flow rate F2*b* of the burner sector 20*b* is increased while the fuel flow rate F2*a* of the burner sector 20*a* is decreased. Consequently, the combustion stability can be improved.

DESCRIPTION OF REFERENCE CHARACTERS

3: Combustor
5: Pilot burner
6: Main burner
20*a* to 20*f*: Burner sector
26: Pilot flow control valve
27*a* to 27*d*: Main flow control valve
30: Controller

What is claimed is:

1. A gas turbine combustor comprising:
    a pilot burner;
    a pilot flow control valve that regulates a flow rate of fuel to be supplied to the pilot burner;
    a main burner of premix combustion type arranged on an outer circumference side of the pilot burner;
    a plurality of main flow control valves that regulate flow rates of fuel to be individually supplied to a plurality of burner sectors into which the main burner is sectioned in a circumferential direction; and
    a controller configured to control the pilot flow control valve and the plurality of main flow control valves,
    a combination chamber arranged on a downstream side of the pilot burner and the main burner, wherein
        the controller is configured to control the plurality of main flow control valves such that, when fuel is to be supplied to all of the plurality of burner sectors, a flow rate of at least one burner sector increases and a flow rate of another burner sector or other burner sectors decreases with respect to an average value of the fuel flow rates of the plurality of burner sectors, whereby a difference in fuel flow rate occurs among the plurality of burner sectors.

2. The gas turbine combustor according to claim 1, wherein
    the controller controls the plurality of main flow control valves such that, when fuel is to be supplied to all of the plurality of burner sectors, each fuel flow rate of the plurality of burner sectors increases and decreases alternately in the circumferential direction with respect to an average value of the fuel flow rates of the plurality of burner sectors.

* * * * *